(12) United States Patent
Lu et al.

(10) Patent No.: US 6,887,817 B2
(45) Date of Patent: May 3, 2005

(54) OLEFIN POLYMERIZATION CATALYST AND PROCESS FOR PREPARING POLYOLEFINS USING SAID CATALYST

(75) Inventors: Bing Lu, Port Lavaca, TX (US); Honglan Lu, Port Lavaca, TX (US); Chih-Jian Chen, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 78 days.

(21) Appl. No.: 10/649,206

(22) Filed: Aug. 27, 2003

(65) Prior Publication Data

US 2004/0039139 A1 Feb. 26, 2004

Related U.S. Application Data

(63) Continuation-in-part of application No. 09/973,396, filed on Oct. 9, 2001, now abandoned.

(51) Int. Cl.$^7$ ................................................ B01J 31/00
(52) U.S. Cl. ................ 502/103; 502/105; 502/115; 502/132; 502/121; 502/122; 502/123; 526/124.3; 526/124.1; 526/124.2; 526/141; 526/145; 526/146; 526/128
(58) Field of Search ................ 502/103, 105, 502/115, 132, 121, 122, 123; 526/124.3, 124.1, 124.2, 141, 145, 146, 128

(56) References Cited

U.S. PATENT DOCUMENTS

| | | | |
|---|---|---|---|
| 3,991,260 A | 11/1976 | Matsura et al. | |
| 4,022,958 A | 5/1977 | Matsura et al. | |
| 4,069,169 A | 1/1978 | Toyoda et al. | |
| 4,143,223 A | 3/1979 | Toyota et al. | |
| 4,180,636 A | 12/1979 | Hirota et al. | |
| 4,347,158 A | * 8/1982 | Kaus et al. | 252/429 B |
| 4,439,537 A | 3/1984 | Murai et al. | |
| 4,450,242 A | 5/1984 | Mink | |
| 4,552,859 A | 11/1985 | Band et al. | |
| 4,673,661 A | * 6/1987 | Lofgren et al. | 502/111 |

FOREIGN PATENT DOCUMENTS

| | | | |
|---|---|---|---|
| JP | 54 122387 | | 9/1979 |
| JP | 54-122387 | * | 9/1979 |

OTHER PUBLICATIONS

Barbe, Pier Camillo, et al.; "The Catalytic System Ti–Comples/MgCl$_2$," Adv. Polm. Sci, 81, 1–81(1987).

Dusseault, John J.; Hsu, Cheng C.; "MgCl$_2$ supported Ziegler–Natta Catalysts for Olefin Polymerization; ; BAsic Structure Mechanism; and Kinetic Behavior", J. Macromol. Sci. Macromol. Chem Phys., C33(2), 103–145 (1993).

Boor, J. Jr.: "Ziegler–Natta Catalysts and Polymerization", Academic Press, New York, 1979.

* cited by examiner

*Primary Examiner*—Ling-Siu Choi
(74) *Attorney, Agent, or Firm*—Howrey Simon Arnold & White LLP (57) ABSTRACT

An olefin polymerization catalyst is described which includes: (A) a solid catalyst component being prepared by copulverizing a magnesium compound, an aluminum compound, an electron donor and a titanium compound, and (B) an organoaluminum compound. The present invention is also directed to a process for preparing polyolefins using the aforesaid catalyst system to polymerize olefins.

18 Claims, 1 Drawing Sheet

OLEFIN POLYMERIZATION CATALYST AND PROCESS FOR PREPARING POLYOLEFINS USING SAID CATALYST

REFERENCES TO RELATED APPLICATIONS

This application is a continuation-in-part of U.S. patent application Ser. No. 09/973,396 filed on Oct. 9, 2001 now abandoned, entitled "Olefin Polymerization Catalyst And Process For Preparing Polyolefins With Said Catalyst", by the same inventor(s) herein.

BACKGROUND OF THE INVENTION

1. Field of the Invention

This invention relates to a novel olefin polymerization catalyst and a process for preparing polyolefins using said catalyst. More specifically, it relates to an olefin polymerization catalyst which includes: (A) a solid catalyst component being prepared by copulverizing a magnesium compound, an aluminum compound, an electron donor and a titanium compound, and (B) an organoaluminum compound. It is also directed to a process for preparing polyolefins, e.g. polyethylene and its copolymers with low solvent extractable, utilizing the aforesaid catalyst.

2. Information Disclosure Statement

Olefin polymerization catalysts are described in the prior art which are obtained by combining a constituent comprising a magnesium halide and a titanium halide with an activating organoaluminum compound. (See: Boor, J. Jr.; "Ziegler-Natta Catalysts and Polymerization", Academic Press, New York, 1979; Barbe, Pier Camillo; et al. "The Catalytic System Ti-Complex/$MgCl_2$", Adv. Polym. Sci., 81, 1–81 (1987); Dusseault, John J. A.; Hsu, Cheng C.; "$MgCl_2$-supported Ziegler-Natta Catalysts for Olefin Polymerization: Basic Structure, Mechanism, and Kinetic Behavior", J. Macromol. Sci. Macromol. Chem. Phys., C33(2), 103–145 (1993)) Nevertheless, the quest for higher catalytic activity coupled with better polymer properties continues. The present invention achieves these two goals.

In the production of polyolefins using Ziegler-Natta catalyst systems, the residual catalyst components go with and remain in polymer product. A high concentration of catalyst residual would not only result in various defects and disadvantages in final product such as coloration and deterioration of molded articles, formation of fish eyes, and yarn breakages and coloration of fibrous articles, but also causes such undesired phenomena in polymer processing machines as rusting and corrosion. However, it is extremely difficult and costly to remove such catalyst residual from the resulting polymer product, and it is practically impossible to accomplish such removal. The only possible way to overcome such problem in polyolefin industry has been through new catalyst development to improve catalyst efficiency. The catalyst efficiency is reflected by catalyst activity, which is normally measured by the grams of polyolefin produced per gram of catalyst containing titanium or other transition metal. The higher the activity, the lower the amount of residual catalyst components remaining in the resulting polymer product. If the activity is high enough, the catalyst residue can be reduced to such level that its existence will have little or no adversary effect on polymer properties and processing machines. While almost all existing commercially available olefin polymerization catalyst systems are efficient enough to eliminate the step of removing catalyst residue from the resulting polymer product, a considerably large amount of additives is still required to neutralize the residual catalyst components in order to achieve good quality polymer products. In addition, the additives for such purpose are rather expensive. Therefore, it is very desirable to further improve catalyst efficiency and consequently to completely eliminate the problems caused by catalyst residue without too many additives.

During olefin polymerization, there are chances of formation of low molecular weight polyolefin polymers or oligomers, which are normally dissolved in hydrocarbon solvents under high temperatures and characterized as solvent extractable. In this patent, we define solvent extractable as the low molecular weight polyolefin polymers or oligomers which are dissolved in an extraction hydrocarbon solvent such as hexane and heptane under continuous refluxing the extraction solvent.

The formation of solvent extractable during olefin polymerization processes will impair reactor heat transfer and dryer efficiency and consequently lower production efficiency. In addition, the solvent extractable in polyolefin resins generally impair transparency, impact resistance and blocking property of processed resin. Furthermore, the solvent extractable often causes a lot of troubles during polymer processing, such as smoking and die buildup. However, to remove such wax and oligomers from the resulting polymer products requires additional expensive equipment such as filtration and adds more complexity in the polymer production process. Therefore, it is very desirable to have a catalyst system capable of producing polyolefins with low solvent extractable formation during polymer production process.

It is also desirable to produce polymer powder with as high bulk density as possible. Low polymer bulk density will cause a lot of reactor operational problems, such as poor heat transfer, poor dryer and centrifuge efficiency, lower production rate, and clogging of transportation equipment, etc. Thus, a high bulk density and a good flow property of polymer powder are desirable from the viewpoint of stability and efficiency of operation.

It is also very desirable that a catalyst system for olefin polymerization have a good comonomer incorporation ability to reduce the usage of the often more expensive comonomer, and in the meantime, to tailor polymer molecular structure and composition, and consequently to achieve better polymer properties.

U.S. Pat. No. 3,991,260 discloses a catalyst being prepared by copulverizing a magnesium dihalide, an aluminum alkoxide and a titanium or vanadium compound with a considerably higher polymerization activity and polymer bulk density. However, this catalyst has been found to produce polyolefin with a high content of solvent extractable in olefin polymerization, and the catalyst activity and polymer bulk density are still desired to be improved.

It is known in the art that improved olefin polymerization catalysts can be prepared by co-milling magnesium dihalide, an organic ester and titanium tetrachloride. The organic ester such as ethyl benzoate is found to decrease the crystallite size of magnesium dihalide and introduce crystal distortions. When used to polymerize propylene, these catalysts provide higher isotactic index, or lower amount of atactic soluble polypropylene.

U.S. Pat. No. 4,069,169 discloses a catalyst prepared by milling magnesium chloride, ethyl benzoate, and titanium tetrachloride followed by the treatment with titanium tetrachloride, optionally in the presence of a hydrocarbon solvent.

U.S. Pat. No. 4,143,223 discloses a solid halogen-containing titanium catalyst component obtained by reacting a mechanically copulverized solid product in the absence of mechanical pulverization with a titanium compound which is liquid under the reaction conditions, said mechanically copulverized product being derived from a magnesium compound, an organic acid ester, and an active hydrogen-containing compound selected from the group of alcohols and phenols.

U.S. Pat. No. 4,450,242 discloses a catalytic component containing titanium obtained by: (i) copulverizing a substantially anhydrous magnesium compound containing halogen or manganese compound containing halogen with a phenol, an organic polymer containing silicon, a titanium halide, and an electron donor compound to produce a copulverized product, and (ii) reacting the copulverized product with a liquid titanium compound containing halogen.

U.S. Pat. No. 4,347,158 discloses that an enhanced support made of the materials comprising a support base, an inorganic Lewis acid and an electron donor is combined with an active transition metal compound and optionally a second electron donor to form the catalyst component. In the preferred embodiment of U.S. Pat. No. 4,347,158 a catalyst is prepared by copulverizing magnesium dichloride, aluminum trichloride, anisole, with a complex of titanium tetrachloride and ethyl benzoate. This patent specifically requires that the solid catalyst component is an inorganic Lewis acid and preferably as inorganic aluminum trichloride, whereas, in the present invention, an organic aluminum compound is used as a copulverizing component and preferably as aluminum trialkoxide.

Further, there are no indications that these catalysts described in the U.S. Pat. No. 4,069,169, No. 4,143,223, No. 4,450,242 and No. 4,347,158 can produce polyethylene and its copolymers with low solvent extractable. Furthermore, the polymerization activities of these catalysts and polymer bulk densities are still unsatisfactory and desired to be improved. In addition, those catalyst systems exhibit a decay olefin polymerization kinetic characteristics, which has a high initial catalyst activity and the activity decreases rapidly with time. Such a decay kinetic behavior is not desired for polyolefin production process. The present invention overcomes all of these shortcomings of the prior art.

U.S. Pat. No. 4,022,958 relates to a process for preparing polyolefins using an improved polymerization catalyst. According to the invention, there is provided a process for preparing polyolefins by polymerizing or copolymerizing olefins using a catalyst prepared from a component with a titanium compound and/or a vanadium compound supported on a solid carrier and an organoaluminum compound and/or an organozinc compound, said solid carrier comprising a member selected from the group consisting of a reaction product A obtained by reacting (1) an organic carboxylate salt of magnesium and (2) an aluminum compound represented by the general formula $Al(OR)_3$ wherein R is an organic radical containing from 1 to 20 carbon atoms under such a condition that the aluminum compound is present in excess of a (2):(1) molar ratio of at least 1:6:1 and a reaction product B obtained by treating said reaction product A with a halogenating agent.

U.S. Pat. No. 4,180,636 demonstrates a process for polymerizing or co-polymerizing propylene in the presence of a catalyst consisting essentially of (A) a solid catalyst component which is prepared by contacting a copulverized material obtained by copulverizing a magnesium dihalide compound together with an acyl halide with (2) a mixture or addition-reaction product of a tetravalent titanium compound containing at least one halogen atom with at least one electron donor compound selected from the group consisting of organic compounds containing a P—O bond, organic compounds containing an Si—O bond, ether compounds, nitrite ester compounds, sulfite ester compounds, alcohol compounds, phenol compounds and naphthol compounds, (B) a trialkyl aluminum compound, and (C) a carboxylic acid ester compound.

U.S. Pat. No. 4,439,537 describes a process for the preparation of the former catalyst component of a catalyst for the polymerization of olefins composed of a titanium-based catalyst component and an organo aluminum compound is disclosed. The former catalyst component can readily be produced by contacting (a) a fatty acid salt of magnesium, (b) an electron donor compound and (c) a titanium halide. In the polymerization of olefins by use of the former catalyst component, both the amount of catalyst residues in the produced polymer and halogen content therein are greatly reduced with high polymerization activity per unit weight of the former catalyst component and with high yield of stereoregular polymer.

U.S. Pat. No. 4,552,859 describes how isotactic index improvement is achieved for $C_3$ and higher alpha olefins in systems containing a catalyst component comprising titanium supported on a magnesium halide support. The titanium component is formed by copulverizing the magnesium halide with one or more electron donors followed by treatment with liquid titanium halide. The improvement is achieved by using a dialkylaluminoxane component with the trialkylaluminum co-catalyst normally used. In slurry polymerizations, the isotactic index of the polymer has been improved.

U.S. Pat. No. 4,673,661 describes catalysts for polymerization and copolymerization of olefins to form polymers having a high degree of isotacticity and fast rate of crystal transformation. The catalysts embody a component made by chlorinating a magnesium alkyl with chlorine or a mixture of chlorine and alkyl chloride to form a carrier, contacting the carrier first with liquid $TiCl_4$ then with a Lewis base, and after that at least once with $TiCl_4$ in the absence of Lewis base.

Notwithstanding the prior art, the present invention is neither taught nor rendered obvious thereby.

SUMMARY OF THE INVENTION

This invention relates to a novel olefin polymerization catalyst and a process for preparing polyolefins using said catalyst.

It is a primary object of this invention to provide a novel and practical useful catalyst system for polymerization of olefins, which is suitable to produce polyolefin, particularly polyethylene and its copolymers with low solvent extractable and superior polymer properties, and which is free of drawbacks of the prior art.

It is another object of this invention to provide a catalyst for polymerization of olefins, which has high catalyst efficiency and can produce polyolefins with extremely low catalyst residue, and therefore achieve superior polymer product properties and quality without using too much additive compounds.

It is a further object of this invention to provide an olefin polymerization catalyst system, which can give a powdery polymer with a high bulk density and good flow ability.

It is a further object of this invention to provide a novel catalyst system, which is suitable for co-polymerization of ethylene and higher alpha olefins with good comonomer incorporation ability.

It is also a further object of this invention to provide a novel catalyst system, which exhibits a very steady polymerization kinetic behavior for both homo-polymerization and co-polymerization of olefins.

Surprisingly, low solvent extractable, high catalyst efficiency, high polymer bulk density, as well as better comonomer incorporation can all be achieved by employing the novel catalyst of the present invention for polymerizing olefins. The novel catalyst comprises: (A) a solid catalyst component being prepared by copulverizing one or more specific magnesium compounds, one or more specific aluminum compounds, one or more specific titanium compounds, and one or more electron donors, and (B) one or more organoaluminum compounds. The present invention also relates to a process for preparing polyolefins using the same.

One of the advantages of the novel catalyst system of the present invention is that it is capable of producing polyolefins, particularly polyethylene and its copolymers, with minimized solvent extractable formation during the polymer production process. Therefore, the costly step of removing low molecular weight wax and oligomers from the resulting polymer can be eliminated. The resulting polymer products by the novel catalyst system of the present invention exhibit improved transparency, dart impact strength and anti-blocking properties. Moreover, this also eliminates the smoking and die buildup problems caused by high solvent extractable during polymer processing. Furthermore, low solvent extractable formation during the polymerization process also improves heat transfer efficiency, and consequently increases the production efficiency.

Another advantage of the novel catalyst system of the present is that it has very high polymerization activity. The high polymerization activity further reduces the concentration of catalyst residue in the resulting polymer product, which results in improved polymer properties and quality and reduced usage of polymer stabilization additives. In addition, high catalyst efficiency reduces the usage of catalyst to produce the same amount of polymer product, therefore, makes the polymer production process more efficient and more economical.

A further advantage of this invention is that the novel catalyst yields a powdery polymer having a high bulk density and good flow ability, which results in improved dryer and centrifuge efficiency, heat transfer efficiency, polymer transportation during the production process, and an ultimate increase of the production rate.

A further advantage of this invention is that the resulting powdery polymer has a narrow particle size distribution and a relatively small portion of fine particles. This makes it feasible to carry out the polymerization reaction in a continuous fashion without reactor fouling, and also facilitates centrifuge separation of polymer particles as well as the transportation or otherwise handling of the polymer.

A further advantage of the novel catalyst system of the present invention is that it exhibits a very steady polymerization kinetic behavior and long active life time for both homo-polymerization and co-polymerization of olefins, which is very desirable for polyolefin production process to ensure the stable reactor process control.

A still further advantage of this invention is that the novel catalyst has a broad range of hydrogen response, which makes it easy to adjust various melt index grades of products by controlling the concentration of hydrogen.

Another advantage of this invention is that the novel catalyst can enhance the ability of incorporation of comonomer in case of copolymerization of ethylene with other higher alpha-olefins, achieving better polymer properties such as high impact strength and exceptionally good environmental stress cracking resistance (ESCR).

Another, yet important advantage of this invention is that this novel catalyst is suitable for a multiple stage reactor process to produce bimodal molecular weight distribution polyethylene products due to the steady polymerization kinetic characteristics and long active life time and wide range of hydrogen response of the novel catalyst system.

BRIEF DESCRIPTION OF THE DRAWINGS

The present invention should be more fully understood when the specification herein is taken in conjunction with the drawings appended hereto wherein.

DETAILED DESCRIPTION OF THE PRESENT INVENTION

A solid catalyst component (A) is prepared by copulverizing one or more of each of a magnesium compound, an aluminum compound, an electron donor and a titanium compound.

(a) The magnesium compound, represented by the formula $Mg(OR)_{2-n}X_n$ wherein R is an alkyl radical containing up to 12 carbon atoms, $1 \leq n \leq 2$ and X is a halogen atom, is substantially anhydrous. Examples of this compound are magnesium dichloride, magnesium dibromide, magnesium difluoride, magnesium diiodide, magnesium ethoxychloride, magnesium methoxychloride and magnesium isopropoxychloride, and among which magnesium dichloride is particularly preferable.

(b) The aluminum compound is represented by the formula $Al(OR')_3$ wherein R' is an alkyl radical containing up to 12 carbon atoms, or an aryl group. Examples of such aluminum compounds are aluminum trimethoxide, aluminum triethoxide, aluminum tri-n-propoxide, aluminum triisopropoxide, aluminum tri-n-butoxide, aluminum tri-sec-butoxide, aluminum tri-t-butoxide, diethoxyaluminum butoxide, ethoxyaluminum dibutoxide and aluminum phenoxide, and among which aluminum triethoxide and aluminum trimethoxide are particularly preferable.

(c) The electron donor compound is selected from organic compounds which contain at least one atom selected from oxygen, silicon, nitrogen, sulfur, and phosphorus atoms, for example, ethers, alcohols, esters, ketones, silanes, acyl halides, amines, phosphines, phosphine amides, and the like. Preferable among them are esters, silanes and acyl halides.

Esters which may be used saturated or unsaturated esters represented by the formula $R^1COOR^2$ where in $R^1$ and $R^2$ each is alkyl, alkenyl, aralkyl, cycloalkyl or aryl, or those substituted with halogen, or cyclic esters. Examples include but not limit butyl formate, ethyl acetate, butyl acetate, ethyl acrylate, ethyl butyrate, isobutyl isobutyrate, methyl methacrylate, diethyl maleate, diethyl tartrate, ethyl cyclohexanecarbonate, ethyl benzoate, ethyl p-methoxybenzoate, methyl p-methylbenzoate, ethyl p-tert-butylbenzoate, dialkyl phthalate, diallyl phthalate, and ethyl alpha-naphthoate. Preferable among them are alkyl esters of aromatic carboxylic acid, particularly $C_{1-8}$ alkyl esters benzoic acid or nucleus-substituted benzoic acid such as p-methylbenzoic acid and p-methoxy benzoic acid. The most preferable are ethyl benzoate and dialkyl phthalate.

Silanes which may be used are tetrahydrocarbylsilanes and their halogen or alkoxy derivatives, linear or cyclic organopolysilanes, siloxane polymers, and other silicon-containing organic compounds. Tetrahydrocarbylsilanes and their halogen derivatives are compounds represented by the formula $R^3{}_nSiX_{4-n}$ wherein $R^3$ is alkyl radical containing up to 16 carbons, X is a halogen atom and n is 1 to 4; for example, tetramethylsilane, trimethylphenylsilane, tetraphenylsilane, trimethylvinylsilane, ethyltrichlorosilane, diethyldichlorosilane, triethylchlorosilane, phenyltrichlorosilane, diphenyldichlorosilane, vinyltrichlorosilane, diethyldifluorosilane and others. Alkoxy derivatives of tetrahydrocarbylsilanes are compounds represented by the formula, $R^4{}_nSi(OR^5)_{4-n}$, wherein $R^4$ and $R^5$ each is alkyl radical containing up to 16 carbons and n is 1 to 3; for example, trimethoxymethylsilane, diphenyldimethoxysilane, dimethyldiethoxysilane, diethyldiethoxysilane, triphenylethoxysilane and the like. Examples of linear or cyclic organopolysilanes are hexamethyldisilane, hexaphenyldisilane, decamethylcyclohexasilane and the like. Siloxane polymers which may be used are polymers having a recurring unit of the formula, —$R^6R^7SiO$— wherein $R^6$ and $R^7$ is hydrogen, alkyl or aryl radical, such as alkylsiloxane polymers, arylsiloxane polymers and alkylarylsiloxane polymers; for example, octamethyltrisiloxane, octaethyltrisiloxane, dimethylpolysiloxane, ethylpolysiloxane, methylethylpolysiloxane, hexaphenylcyclosiloxane, diphenylpolysiloxane, diphenyloctamethylpolysiloxane, methylphenylpolysiloxane and the like. Examples of other silicon-containing organic compounds include 3-chloropropyltrimethoxysilane, 3-methoxypropyltrimethoxysilane, 3-(triethoxysilyl)propylsuccinic anhydride, 2-(trimethoxysilyethyl)prydine, (N,N-dimethylaminopropyl)trimethoxysilane, hexamethylsilazane, triethylisocyanesilazane, triphenylisocyanatosilane, cyanomethyltrimethylsilane, trimethylsilylactetone and others. Preferable among silane compounds are diphenyldichlorosilane, diphenyldimethoxysilane, dimethyldiethoxysilane, dimethylpolysiloxane and diphenylpolysiloxane.

Acyl halides are compounds represented by general formula $R^8$—CO—X, wherein $R^8$ represents a hydrocarbon radical having at most 20 carbon atoms selected from the group consisting of alkyl radicals, alkenyl radicals, cycloalkyl radicals, cycloalkenyl radicals, aryl radicals, and aralkyl radicals, and derivatives of these hydrocarbon radicals substituted with at most 3 halogen atoms or alkoxy radicals having at most 20 carbons and X is halogen atom; for example, acetyl chloride, propionyl chloride, buturyl chloride, stearoyl chloride, trichloroacetyl chloride, succinyl dichloride, cyclohexane carbonyl chloride, benzoyl chloride, benzoyl bromide, naphthoyl chloride, naphthoyl bromide, toluoyl chloride, toluoyl bromide, phthaloyl dishloride, anisoyl chloride and chlorobenzoyl chloride. Preferable among acyl halide compounds are aromatic carbonyl halide compounds, and particularly benzoyl chloride, benzoyl bromide, and toluoyl chloride.

The electron donor may be a single compound or a mixture of several compounds described above.

(d) The titanium compound is represented by the formula $Ti(OR'')_{4-p}X_p$ wherein R'' is an alkyl radical containing up to 12 carbon atoms $1 \leq p \leq 4$ and X is a halogen atom. Examples of such titanium compounds are titanium tetrahalides such as $TiCl_4$, $TiBr_4$ and $TiI_4$; alkoxytitanium trihalides such as $Ti(OCH_3)Cl_3$, $Ti(OC_2H_5)Cl_3$, $Ti(On-C_4H_9)Cl_3$, $Ti(OC_2H_5)Br_3$, $Ti(Oiso-C_4H_9)Br_3$ and $Ti(Ocyclo-C_6H_{12})Cl_3$; aryloxy titanium trihalides such as $Ti(OC_6H_5)Cl_3$; alkoxytitanium dihalides such as $Ti(OCH_3)_2Cl_2$, $Ti(OC_2H_5)_2Cl_2$, $Ti(On-C_4H_9)_2Cl_2$, and $Ti(OC_2H_5)_2Br_2$; and trialkoxytitanium monohalides such as $Ti(OCH_3)_3Cl$, $Ti(OC_2H_5)_3Cl$, $Ti(On-C_4H_9)_3Cl$, and $Ti(OC_2H_5)_3$ Br. Of these, the titanium tetrahalides are preferred, and titanium tetrachloride is most preferred. The titanium compound may be a single compound or a mixture of several titanium compounds.

Figure 1:
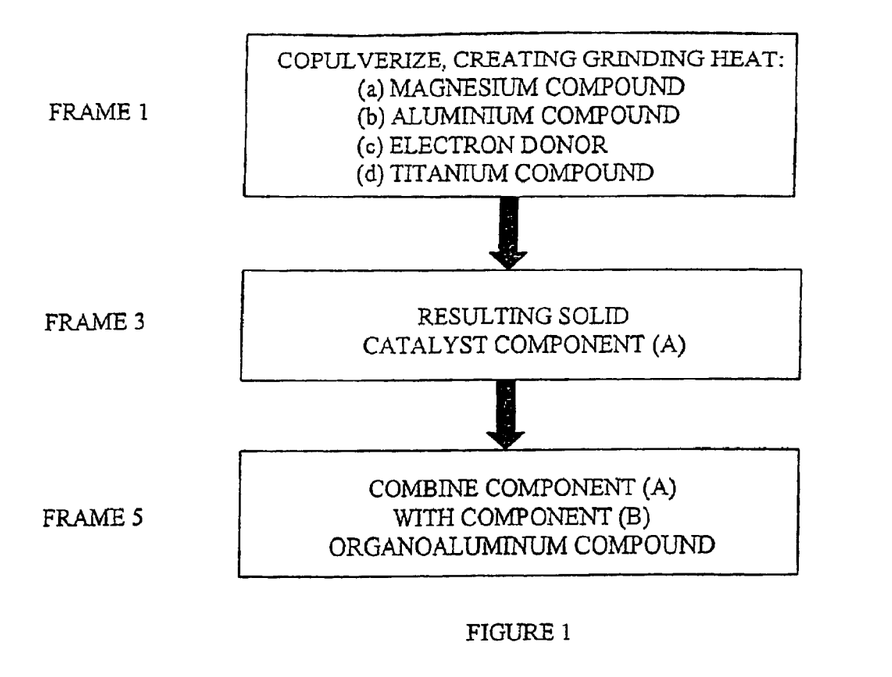
FIG. 1 is a schematic diagram of the present invention catalyst preparation; and, FIG. 2 is a schematic diagram of the present invention olefin polymerization process.

FIG. 1 illustrates schematically the method of preparing the catalyst system of the present invention. As shown in FIG. 1, Frame 1 indicates copolymerizing the four components described above, so as to create grinding heat, resulting in solid catalyst component (A), shown in Frame 3. Next, as shown in Frame 5 solid catalyst component (A) is combined with component (B) organoaluminum compound to achieve the present invention catalyst system.

The copulverization is carried out in any suitable grinding apparatus such as vibration ball mill, rotation ball mill, impact mill and planetary mill. The purpose of the copulverization is to bring the reagents into more intimate contact than the usual mixing step which is intend only to create physical homogeneity. Use of a ball mill is preferred, especially employing stainless steel balls, but ceramic, glass or balls of other materials may be used. The copulverization is very preferably carried out in the substantial absence of oxygen or moisture.

The grinding conditions will be dependent on the grinding technique and on the nature of the materials being ground. However, in general it is preferred to carry out the grinding for a period of from 10 minutes to 5 days particularly from 1 to 50 hours. Any suitable temperature may be used for the grinding, for example, from –50° C. to 200° C., especially from –10° C. to 100° C., and, if desired, the temperature may be varied during the grinding operation. The grinding may be carried out without applying heating or cooling to the pulverizing apparatus. However, the conditions of grinding are generally such that heat is generated during the grinding and hence, in order to operate at an essentially constant temperature for example ambient temperature, which is the generally desired procedure, it may be necessary to apply cooling to the grinding apparatus. The need for cooling will be dependent on the mill size and the milling conditions.

During the copulverization, a diluent solvent may be added in to help the milling. The diluent which can be used for this purpose includes aliphatic hydrocarbons such as pentane, hexane, heptane, octane, and the like; aromatic hydrocarbons such as benzene, toluene, xylene and the like; alicyclic hydrocarbons such as cyclohexane, cyclopentane and the like; and halogenated hydrocarbons such as 1,2-dichloroethane, monochlorobenzene and the like.

The four constituents (a), (b), (c) and (d) can be brought to contact each other according to any combination of contact order. Some examples of the contact order are as follows:

(1) a+b+c+d (the four constituents are simultaneously brought to contact each other), (2) (a+b)+(c+d) ((a) and (b), and (c) and (d) are brought into contact, respectively, and thereafter the resulting two mixtures are brought into contact with each other), (3) [(a+b)+c]+d, (4) [(a+c)+b]+d, (5) [((a+b)+c1)+c2]+d (electron donor c1 and c2 may be same or different), (6) [((a+b)+c1)+d]+c2, (7) (a+b)+(c+d)+b,
(8) (a+d)+b+c
(9) (a+d)+(b+c)
(10) [(a+b)+b]+(c+d), and
(11) [a+b+(c+d)]+b.

The contact order is not limited to the above mentioned orders. However, whichever method may be adopted, it is important that the respective constituents (a), (b), (c) and (d) be caused to thoroughly contact each other.

The mole ratio of the aluminum compound to the magnesium compound may range from 0.001:1 to 2:1, preferably from 0.005:1 to 1:1, more preferably from 0.01:1 to 0.5:1.

The mole ratio of the electron donor to the magnesium compound is in a range of from 0.001:1 to 10:1, preferably from 0.005:1 to 1:1, more preferably from 0.01:1 to 0.5:1.

The amount of titanium compound is controlled so that the amount of titanium in the resulting solid is in a range of from 0.1 to 20% by weight, preferably from 0.5 to 10% by weight, more preferably from 1 to 8% by weight.

In case of a diluent solvent used in the copulverization, the weight ratio of solvent to the magnesium compound is in a range of from 0.01:1 to 1:1, preferably from 0.01:1 to 0.5:1.

The solid catalyst component A is activated with an organoaluminum compound B for the process of olefin polymerization. A suitable organoaluminum compound is generally a compound represented by the formula: $AlR'''_q Y_{3-q}$ wherein R''' represents hydrogen or an alkyl radical having from about 1 to 12 carbon atoms, Y represents a halogen or an alkoxy group having from about 1 to 12 carbons atoms and q is in a range of $1 \leq q \leq 3$. Examples of such aluminum compounds are triethylaluminum, tri-n-propylaluminum, tri-iso-butylaluminum, tri-n-octylaluminum, tri(2-methylpentyl)aluminum, di-iso-butylaluminum hydride, ethylaluminum sesquichloride, diethylaluminum chloride, ethylaluminum dicholoride, diethylaluminuim ethoxide, diethylaluminum iodide, methylaluminoxane, and ethylaluminoxane, and among which triethylaluminum is preferable. The molar ratio of the organoaluminum compound to the metal titanium in the solid catalyst A may range from 10000:1 to 0.1:1, preferably from 1000:1 to 0.5:1, more preferably from 200:1 to 1:1.

Figure 2:
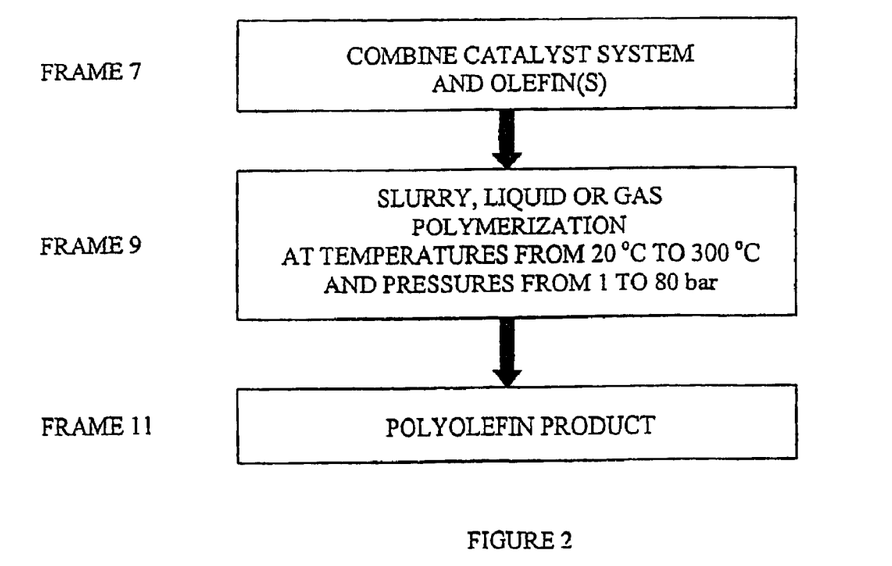

The process for polymerizing olefins according to the present invention is essentially the same as a conventional process using a Ziegler-Natta type catalyst except that the catalyst used is as described above. As shown in FIG. 2 the present invention catalyst system and one or more olefins are combined in Frame 7, and a slurry, liquid or gas polymerization is performed under temperatures from 20° C. to 300° C. and pressures from 1 to 80 bar in Frame 9 to result in the superior quality in present invention polyolefin product in Frame 11.

Accordingly, one or more olefins having from about 2 to 18 carbon atoms may be polymerized according to the present invention. Examples of such olefins are ethylene, propylene, 1-butene, 1-pentene, 1-hexene, 1-heptene, 1-octene, 1-nonene, 1-decene, 1-methyl 1-pentene, 4-methyl-1-hexene, 5-methyl-1-hexene, 4,4-dimethyl-1-pentene, 1-methyl-1-heptene, 5-methyl-1-heptene, 6-methyl-1-heptene, and 4,4dimethyl-1-hexene. Particularly preferred olefins which are intended to be polymerized according to the present invention are ethylene, propylene, 1-butene and 1-hexene. Mixtures of these olefins may be used, for example, ethylene/propylene, ethylene/1-butlene, ehtylene/1-hexene, and ethylene/1-butene/1-hexene.

The polymerization of olefins may be carried out by a slurry polymerization method, wherein an inert hydrocarbon such as hexane or heptane is used as a solvent; a bulk polymerization method, wherein a liquefied monomer is used; or a gas phase polymerization method, wherein a monomer is present in gas phase. The polymerization may be carried out by a continuous or batch process. Substantially oxygen-free and moisture-free conditions are maintained throughout the reaction. The polymerization conditions for olefins include temperatures in a range from 20° C. to 300° C., preferably 50° C. to 180° C., and pressures in a range of 1 to 80 bar, preferably from 2 to 50 bar.

In polymerizing olefins with the use of the catalyst of this invention, the molecular weight can be easily controlled in the resulting polymers by adjusting the polymerization conditions such as polymerization temperature and the amount of the catalyst, but may more effectively be accomplished by adding hydrogen into the polymerization system.

With the catalyst of the invention, one, two or more than two stage polymerization reactions with different polymerization conditions at each stage may be employed. For example, different hydrogen concentrations and/or polymerization temperatures may be used, e.g., bimodal high density polyethylene two- or three-stage slurry reactor process may be employed.

The polymerization activity in gPolymer/gCat.bar.hr is calculated by dividing the polymer weight in gram by the catalyst weight in gram, monomer pressure in bar and polymerization time in hour.

The solvent extractable of polyolefin is the weight percentage of hexane extractable portion in the polyolefin measured by extracting the powdery polyolefin sample using Soxhlet extractor and hexane solvent for 16 hours.

The bulk density or apparent density in $g/cm^3$ is measured following ASTM D1622 procedure.

Melt index (MI) is measured following ASTM D1238 procedure. The melt index (MI) in g/10 min at 190° C. is using a weight of 2.16 Kg, and high load melt index (HLMI) in g/10 min at 190° C. is using a weight of 21.6 Kg. Melt flow ratio is the ratio of HLMI to MI.

The density of polymer in $g/cm^3$ is measured following ASTM D1505 and D2839 procedures.

Mechanical tests are all followed ASTM standard procedures.

Examples of the present invention are set forth hereunder. These examples are presented to illustrate the scope of the present claims, not to limit it.

EXAMPLE 1

10 a. Preparation of the Catalyst 14.34 g (150.6 mmol) of anhydrous magnesium dichloride, 2.5 g (15.4 mmol) of aluminum triethoxide, 2.1 g (14 mmol) ethyl benzoate and 3.15 g (16.6 mmol) titanium tetrachloride were co-milled in a vibration ball mill for 15 hours at room temperature under a nitrogen atmosphere. As a result, there was obtained a light gray powdered solid.

b. Homopolymerization of Ethylene

A 2 liter stainless steel autoclave equipped with a stirrer and a jacket for heating and cooling, which had been dried and the inside atmosphere of which had been replaced with nitrogen, was charged with 1 liter hexane and the temperature was elevated to 50° C. by heating. Then, 1 mmol of triethyl aluminum and 20.5 mg of the solid catalyst obtained as disclosed in (a) above were added successively into the autoclave, and the temperature was raised to 85° C. with stirring. The system, which was at a pressure of 29 psi (2 bar) from vapor pressure of the hexane with adjusting of nitrogen pressure, was pressurized with hydrogen to a total pressure of 87 psi and then followed ethylene to a total pressure of 145 psi to initiate the polymerization reaction.

The reaction was maintained for 1 hour under this condition with a continuous ethylene feed to maintain a constant total pressure during the course of the polymerization. Then the reaction mixture was cooled and about 100 ml acidified methanol was added into the mixture, and the resulting polymer was separated by filtration and dried under reduced pressure at 70° C. for 6 hrs to obtain 127 g white polyethylene with a MI of 15.6 g/10 min, bulk density of 0.37 g/cm$^3$ and hexane extractable of 0.8 wt %. The catalyst activity was 1549 gPE/gCat.bar.hr.

c. Copolymerization of Ethylene and 1-hexene

A 2 liter stainless steel autoclave equipped with a stirrer and a jacket for heating and cooling, which had been dried and the inside atmosphere of which had been replaced with nitrogen, was charged with 1 liter hexane and the temperature was elevated to 50° C. by heating. Then, 1 mmol of triethyl aluminum and 10.1 mg of the solid catalyst obtained as disclosed in (a) above were added successively into the autoclave, and the temperature was raised to 80° C. with stirring. The system, which was at a pressure of 29 psi from vapor pressure of the hexane with adjusting of nitrogen pressure, was injected with 10 ml Hexene and 5 psi hydrogen through a 300 ml stainless steel bomb, and then followed with ethylene to a total pressure of 145 psi to initiate the reaction. The copolymerization was conducted for 30 min under a continuous ethylene feed to maintain the constant reactor pressure. The reaction mixture was cooled and about 100 ml acidified methanol was added into the mixture, and the resulting polymer was separated by filtration and dried under reduced pressure at 70° C. for 6 hrs to obtain 137 g of white polyethylene with a HLMI of 0.5 g/10 min, bulk density of 0.36 g/cm$^3$ and density of 0.953 g/cm$^3$. The catalyst activity was 3391 gPE/gCat.bar.hr.

COMPARATIVE EXAMPLE 1

14.34 g (150.6 mmol) of anhydrous magnesium dichloride and 3.15 g (16.6 mmol) titanium tetrachloride were pulverized together in the same manner as in Example 1 to give a light gray powdered solid. A homopolymerization was conducted in the same manner as in Example 1 except that 20.2 mg of the above said solid catalyst was employed, to yield 84.5 g of white polyethylene with a MI of 8.7 g/10 min, bulk density of 0.15 g/cm$^3$ and hexane extractable of 1.6 wt %. The catalyst activity was 1046 gPE/gCat.bar.hr. A copolymerization was conducted in the same manner as in Example 1 except that 10.4 mg of the above said solid catalyst was employed, to yield 76.6 g of white polyethylene with a HLMI of 0.31 g/10 min, bulk density of 0.14 g/cm$^3$ and density of 0.967 g/cm$^3$. The catalyst activity was 1841 gPE/gCat.bar.hr.

COMPARATIVE EXAMPLE 2

14.34 g (150.6 mmol) of anhydrous magnesium dichloride, 2.5 g (15.4 mmol) of aluminum triethoxide and 3.15 g (16.6 mmol) titanium tetrachloride were pulverized together in the same manner as in Example 1 to give a light gray powdered. A homopolymerization was conducted in the same manner as in Example 1 except that 20.3 mg of the above said solid catalyst was employed, to yield 110.1 g of white polyethylene with a MI of 12.7 g/10 min, bulk density of 0.20 g/cm$^3$ and hexane extractable of 2.1 wt %. The catalyst activity was 1356 gPE/gCat.bar.hr. A copolymerization was conducted in the same manner as in Example 1 except that 9.9 mg of the above said solid catalyst was employed, to yield 87.4 g of white polyethylene with a HLMI of 0.40 g/10 min, bulk density of 0.18 g/cm$^3$ and density of 0.965 g/cm$^3$. The catalyst activity was 2207 gPE/gCat.bar.hr.

COMPARATIVE EXAMPLE 3

14.34 g (150.6 mmol) of anhydrous magnesium dichloride, 2.05 g (15.4 mmol) of aluminum trichloride and 3.15 g (16.6 mmol) titanium tetrachloride were pulverized together in the same manner as in Example 1 to give a light gray powdered solid. A homopolymerization was conducted in the same manner as in Example 1 except that 20.5 mg of the above said solid catalyst was employed, to yield 89.3 g of white polyethylene with a MI of 9.8 g/10 min, bulk density of 0.16 g/cm$^3$ and hexane extractable of 1.9 wt %. The catalyst activity was 1089 gPE/gCat.bar.hr. A copolymerization was conducted in the same manner as in Example 1 except 10.2 mg of the above said solid catalyst was employed, to yield 77.4 g of white polyethylene with a HLMI of 0.35 g/10 min, bulk density of 0.16 g/cm$^3$ and density of 0.967 g/cm$^3$. The catalyst activity was 1897 gPE/gCat.bar.hr.

COMPARATIVE EXAMPLE 4

14.34 g (150.6 mmol) of anhydrous magnesium dichloride, 2.1 g (14 mmol) ethyl benzoate and 3.15 g (16.6 mmol) titanium tetrachloride were pulverized together in the same manner as in Example 1 to give a light gray powdered solid. A homopolymerization was conducted in the same manner as in Example 1 except that 20.2 mg of the above said solid catalyst was employed, to yield 103.3 g of white polyethylene with a MI of 9.6 g/10 min, bulk density of 0.24 g/cm$^3$ and hexane extractable of 1.3 wt %. The catalyst activity was 1278 gPE/gCat.bar.hr. A copolymerization was conducted in the same manner as in Example 1 except that 10.2 mg of the above said solid catalyst was employed, to yield 84.2 g of white polyethylene with a HLMI of 0.34 g/10 min, bulk density of 0.22 g/cm$^3$ and density of 0.962 g/cm$^3$. The catalyst activity was 2064 gPE/gCat.bar.hr.

COMPARATIVE EXAMPLE 5

14.34 g (150.6 mmol) of anhydrous magnesium dichloride, 2.05 g (15.4 mmol) of aluminum trichloride, 2.1 g (14 mmol) ethyl benzoate and 3.15 g (16.6 mmol) titanium tetrachloride were pulverized together in the same manner as in Example 1 to give a light yellow powdered solid. A homopolymerization was conducted in the same manner as in Example 1 except that 20.1 mg of the above said solid catalyst was employed, to yield 90 g of white polyethylene with a MI of 10.2 g/10 min, bulk density of 0.30 g/cm$^3$ and hexane extractable of 1.8 wt %. The catalyst activity was 1119 gPE/gCat.bar.hr. A copolymerization was conducted in the same manner as in Example 1 except that 10.0 mg of the above said solid catalyst was employed, to yield 81 g of white polyethylene with a HLMI of 0.33 g/10 min, bulk density of 0.18 g/cm$^3$ and density of 0.966 g/cm$^3$. The catalyst activity was 2025 gPE/gCat.bar.hr.

EXAMPLE 2

The ball mill operation condition was as same as Example 1, but the reagents were added at a different sequence. 14.34 g (150.6 mmol) of anhydrous magnesium dichloride and 2.5 g (15.4 mmol) of aluminum triethoxide were copulverized for 1 hour. 2.1 g (14 mmol) ethyl benzoate was then charged into the mill and the resulting mixture was pulverized for another 2 hours. 3.15 g (16.6 mmol) titanium tetrachloride were then placed in the mill and the mixture was pulverized for 13 hours. As a result, there was obtained a light gray powdered solid.

A homopolymerization was conducted in the same manner as in Example 1 except that 20.2 mg of the above said solid catalyst was employed, to yield 131.7 g of white polyethylene with a MI of 15.5 g/10 min, bulk density of 0.37 g/cm$^3$ and hexane extractable of 0.8 wt %. The catalyst activity was 1630 g/PE/gCat.bar.hr. A copolymerization was conducted in the same manner as in Example 1 except that 10.1 mg of the above said solid catalyst was employed, to yield 139.4 g of white polyethylene with a HLMI of 0.48 g/10 min, bulk density of 0.36 g/cm$^3$ and density of 0.955 g/cm$^3$. The catalyst activity was 3450 gPE/gCat.bar.hr.

COMPARATIVE EXAMPLE 6

A comparative catalyst was made as Example 19 in U.S. Pat. No. 4,347,158. 15 g anhydrous magnesium, 2.625 g aluminum trichloride and 1.765 g anisole were co-comminuted in a vibration ball mill for 15 hours. 2.585 g ethyl benzoate were added to the mill and the resulting mixture co-comminuted for an additional 5 hours. Finally, 1.89 g titanium tetrachloride were added to the mill and co-comminution resumed for an additional 15 hours. As a result, there was obtained a dark red powdered solid.

A homopolymerization was conducted in the same manner as in Example 2 except that 20.0 mg of the above said solid catalyst was employed, to yield 98 g of white polyethylene with a MI of 11.5 g/10 min, bulk density of 0.31 g/cm$^3$ and hexane extractable of 1.6 wt %. The catalyst activity was 1225 gPE/gCat.bar.hr. A copolymerization was conducted in the same manner as in Example 1 except that 10.2 mg of the above said solid catalyst was employed, to yield 105.3 g of white polyethylene with a HLMI of 0.41 g/10 min, bulk density of 0.30 g/cm$^3$ and density of 0.961 g/cm$^3$. The catalyst activity was 2581 gPE/gCat.bar.hr.

COMPARATIVE EXAMPLE 7

A comparative catalyst was made as Comparative Example 6 except that 3.88 g titanium tetrachloride was used instead of 1.89 g. As a result, there was obtained a dark red powdered solid.

A homopolymerization was conducted in the same manner as in Example 2 except that 20.0 mg of the above said solid catalyst was employed, to yield 95 g of white polyethylene with a MI of 12.6 g/10 min, bulk density of 0.31 g/cm$^3$ and hexane extractable of 1.8 wt %. The catalyst activity was 1188 gPE/gCat.bar.hr. A copolymerization was conducted in the same manner as in Example 1 except that 10.0 mg of the above said solid catalyst was employed, to yield 96.5 g of white polyethylene with a HLMI of 0.45 g/10 min, bulk density of 0.30 g/cm$^3$ and density of 0.963 g/cm$^3$. The catalyst activity was 2413 gPE/gCat.bar.hr.

EXAMPLE 3

14.34 g (150.6 mmol) of anhydrous magnesium dichloride, 2.5 g (15.4 mmol) of aluminum triethoxide, 1.1 g (7.32 mmol) ethyl benzoate and 3.15 g (16.6 mmol) titanium tetrachloride were pulverized in the same procedure as Example 2 to give a light gray powdered solid. A homopolymerization was conducted in the same manner as in Example 1 except that 20.1 mg of the above said solid catalyst was employed, to yield 115 g of white polyethylene with a MI of 13.9 g/10 min, bulk density of 0.36 g/cm$^3$ and hexane extractable of 1.4 wt %. The catalyst activity was 1430 gPE/gCat.bar.hr. A copolymerization was conducted in the same manner as in Example 1 except that 10.2 mg of the above said solid catalyst was employed, to yield 133.5 g of white polyethylene with a HLMI of 0.43 g/10 min, bulk density of 0.34 g/cm$^3$ and density of 0.957 g/cm$^3$. The catalyst activity was 3272 gPE/gCat.bar.hr.

EXAMPLE 4

14.34 g (150.6 mmol) of anhydrous magnesium dichloride, 1.5 g (9.25 mmol) of aluminum triethoxide, 1.6 g (10.7 mmol) ethyl benzoate and 3.15 g (16.6 mmol) titanium tetrachloride were pulverized in the same procedure as Example 2 to give a light gray powdered solid. A homopolymerization was conducted in the same manner as in Example 1 except that 20.4 mg of the above said solid catalyst was employed, to yield 159.6 g of white polyethylene with a MI of 15.1 g/10 min, bulk density of 0.37 g/cm$^3$ and hexane extractable of 0.7 wt %. The catalyst activity was 1956 gPE/gCat.bar.hr. A copolymerization was conducted in the same manner as in Example 1 except that 10.3 mg of the above said solid catalyst was employed, to yield 151.5 g of white polyethylene with a HLMI of 0.49 g/10 min, bulk density of 0.37 g/cm$^3$ and density of 0.956 g/cm$^3$. The catalyst activity was 3677 gPE/gCat.bar.hr.

EXAMPLE 5

The ball mill operation condition was as same as Example 2, but the reagents were added at a different sequence. 14.34 g (150.6 mmol) of anhydrous magnesium dichloride, 1.5 g (9.25 mmol) of aluminum triethoxide were copulverized for 1 hour. 1.6 g (10.7 mmol) ethyl benzoate was then charged into the mill and the resulting mixture was pulverized for another 1 hour. 0.5 g (3.37 mmol) dimethyldiethoxysilane was then added into the mixture and the mixture was then copulverized for 2 hours. 3.15 g (16.6 mmol) titanium tetrachloride was then placed in the mill and the mixture was pulverized for 13 hours. As a result, there was obtained a gray powdered solid.

A homopolymerization was conducted in the same manner as in Example 1 except that 20.2 mg of the above said solid catalyst was employed, to yield 157.8 g of white polyethylene with a MI of 14.7 g/10 min, bulk density of 0.41 g/cm$^3$ and hexane extractable of 0.8 wt %. The catalyst activity was 1953 gPE/gCat.bar.hr. A copolymerization was conducted in the same manner as in Example 1 except that 10.3 mg of the above said solid catalyst was employed, to yield 164.4 g of white polyethylene with a HLMI of 0.52 g/10 min, bulk density of 0.36 g/cm$^3$ and density of 0.953 g/cm$^3$. The catalyst activity was 3990 gPE/gCat.bar.hr.

EXAMPLE 6

The catalyst was prepared as same as Example 5, only 0.5 g (1.84 mmol) diphenyldiethoxysilane was used instead of dimethyldiethoxysilane. As a result, there was obtained a light brown powdered solid. A homopolymerization was conducted in the same manner as in Example 1 except that 20.5 g of the above said solid catalyst was employed, to yield 163.8 g of white polyethylene with a MI of 13.1 g/10 min, bulk density of 0.41 g/cm$^3$ and hexane extractable of 0.8 wt %. The catalyst activity was 1998 gPE/gCat.bar.hr. A copolymerization was conducted in the same manner as in Example 1 except that 10.5 mg of the above said solid catalyst was employed, to yield 170.1 g of white polyethylene with a HLMI of 0.56 g/10 min, bulk density of 0.39 g/cm$^3$ and density of 0.952 g/cm$^3$. The catalyst activity was 4050 gPE/gCat.bar.hr.

EXAMPLE 7

The catalyst was prepared as same as Example 5, only 0.5 g (1.97 mmol) diphenyldichlorosilane was used instead of dimethyldiethoxysilane. As a result, there was obtained a light brown powdered solid. A homopolymerization was conducted in the same manner as in Example 1 except that 20.3 mg of the above said solid catalyst was employed, to yield 155 g of white polyethylene with a MI of 14.5 g/10 min, bulk density of 0.41 g/cm$^3$ and a hexane extractable of 0.9 wt %. The catalyst activity was 1909 gPE/gCat.bar.hr. A copolymerization was conducted in the same manner as in Example 1 except that 10.4 mg of the above said solid catalyst was employed, to yield 166.6 g of white polyethylene with a HLMI of 0.61 g/10 min, bulk density of 0.38 g/cm$^3$ and density of 0.953 g/cm$^3$. The catalyst activity was 4005 gPE/gCat.bar.hr.

EXAMPLE 8

The catalyst was prepared in the same manner as in Example 2, except that 1.96 g (7.04 mmol) of dibutyl phthalate was used instead of ethyl benzoate. A light gray solid was obtained. A homopolymerization was conducted in the same manner as in Example 1 except that 20.2 mg of the above said solid catalyst was employed, to yield 133 g of white polyethylene with a MI of 14.4 g/10 min, bulk density of 0.37 g/cm$^3$ and hexane extractable of 0.9 wt %. The catalyst activity was 1646 gPE/gCat.bar.hr.

EXAMPLE 9

The catalyst was prepared in the same manner as in Example 2, except that 3.94 g (14.2 mmol) of dibutyl phthalate was used instead of ethyl benzoate. A light gray solid was obtained. A homopolymerization was conducted in the same manner as in Example 1 except that 20.4 mg of the above said solid catalyst was employed, to yield 119 g of white polyethylene with a MI of 16.4 g/10 min, bulk density of 0.38 g/cm$^3$ and hexane extractable of 0.8 wt %. The catalyst activity was 1458 gPE/gCat.bar.hr.

EXAMPLE 10

The catalyst was prepared in the same manner as in Example 5, except that 1.96 g (7.04 mmol) of dibutyl phthalate was used instead of ethyl benzoate. A light gray solid was obtained. A homopolymerization was conducted in the same manner as in Example 1 except that 20.3 mg of the above said solid catalyst was employed, to yield 145 g of white polyethylene with a MI of 15.2 g/10 min, bulk density of 0.37 g/cm$^3$ and hexane extractable of 0.9 wt %. The catalyst activity was 1786 gPE/gCat.bar.hr.

EXAMPLE 11

A 2 liter stainless steel autoclave equipped with a stirrer and a jacket for heating and cooling, which had been dried and the inside atmosphere of which had been replaced with nitrogen, was charged with 1 liter hexane and the temperature was elevated to 50° C. by heating. Then, 4 mmol of triethyl aluminum, 0.4 mmol of cyclohexylmethyldimethoxysilane and 20.5 mg of the solid catalyst obtained as disclosed in Example 10 were added successively to the charge of the autoclave, and the temperature was raised to 70° C. with stirring. The system, which was at a pressure of 14.5 psi from vapor pressure of the hexane with adjusting of nitrogen pressure, was pressurized with hydrogen to a total pressure of 29 psi and then followed with propylene to a total pressure of 130.5 psi to initiate the polymerization reaction. The reaction was maintained for 1 hour under this condition with a continuous ethylene feed to maintain a constant total pressure during the course of the polymerization. Then the reaction mixture was cooled and about 100 ml acidified methanol was added into the mixture, and the resulting polymer was separated by filtration and dried under reduced pressure at 70° C. for 6 hrs to obtain 187 g of white polypropylene with bulk density of 0.40 g/cm$^3$, hexane extractable of 2.4 wt % and heptane extractable of 5.6 wt %. The catalyst activity was 1303 gPE/gCat.bar.hr.

EXAMPLE 12

A copolymerization was conducted in the same manner as in Example 1 except that 10.5 mg of the Example 10 solid catalyst was employed, to yield 158 g of white polyethylene with a HLMI of 0.50 g/10 min, bulk density of 0.35 g/cm$^3$ and density of 0.957 g/Cm$^3$. The catalyst activity was 3762 gPE/gCat.bar.hr.

EXAMPLE 13

The ethylene polymerization was conducted by using 10 mg of catalyst as prepared according to Example 4. The homopolymerization conditions were the same as in Example 4 except that the reaction time was extended to 2 hours to yield 154 g of white polyethylene with a MI of 14.9 g/10 min, bulk density of 0.37 g/cm$^3$ and hexane extractable of 0.7 wt %. The catalyst activity was 1925 gPE/gCat.bar.hr.

EXAMPLE 14

The ethylene polymerization was conducted under the sane conditions in Example 13 except that the reaction time was further extended to 4 hours to yield 293 g of white polyethylene with a MI of 14.5 g/10 min, bulk density of 0.37 g/cm$^3$ and hexane extractable of 0.6 wt %. The polymerization of ethylene flow rate was steady throughout polymerization. The catalyst activity was 1831 gPE/gCat.bar.hr. The powdery polymer was sieved and found that the polymer particle below 50 micron was zero percentage.

EXAMPLE 15

Two-Stages Polymerization

A 2 liter stainless steel autoclave equipped with a stirrer and a jacket for heating and cooling, which had been dried and the inside atmosphere of which had been replaced with nitrogen, was charged with 1 liter hexane and the temperature was elevated to 50° C. by heating. Then, 1 mmol of triethyl aluminum and 10.1 mg of the solid catalyst obtained in Example 4 were added successively to the charge of the autoclave, and the temperature was raised to 80° C. with stirring. The system, which was at a pressure of 29 psi from vapor pressure of the hexane with adjusting of nitrogen pressure, was injected with 25 ml hexene and 5 psi hydrogen through a 300 ml stainless steel bomb, and then followed with ethylene to a total pressure to a total pressure of 145 psi, and polymerization was conducted in this state for 25 min. Another 80 psi hydrogen through 300 ml stainless steel bomb was then injected, and the ethylene pressure was maintained to a total pressure of 145 psi, and the polymerization was conducted in this state for 120 min. The reaction mixture was cooled and about 100 ml acidified methanol was added into the mixture, and the resulting polymer was separated by means of a glass filter and dried under reduced pressure at 70° C. for 4 hrs to obtain 298 g of white polyethylene with a HLMI of 10.5 g/10 min, MI of 0.06 g/10 min, bulk density of 0.33 g/cm$^3$, density of 0.946 g/cm$^3$ and hexane extractable of 0.5 wt %. The polymer was also characterized by GPC and showed a bimodal molecular weight distribution.

COMPARATIVE EXAMPLE 8

Two-Stage Polymerization

A 2 liter stainless steel autoclave equipped with a stirrer and a jacket for heating and cooling, which had been dried and the inside atmosphere of which had been replaced with nitrogen, was charged with 1 liter hexane and the temperature was elevated to 50° C. by heating. Then, 1 mmol of triethyl aluminum and 10.2 mg of the solid catalyst obtained in Comparative Example 2 were added successively to the charge of the autoclave, and the temperature was raised to 80° C. with stirring. The system, which was at a pressure of 29 psi from vapor pressure of the hexane with adjusting of nitrogen pressure, was injected with 25 ml hexene and 5 psi hydrogen through a 300 ml stainless steel bomb, and then followed with ethylene to a total pressure of 145 psi, and polymerization was conducted in this state for 25 min. Another 100 psi hydrogen through 300 ml stainless steel bomb was then injected, and the ethylene pressure was maintained to a total pressure of 145 psi, and the polymerization was conducted in this state for 140 min. The reaction mixture was cooled and about 100 ml acidified methanol was added into the mixture, and the resulting polymer was separated by means of a glass filter and dried under reduced pressure at 70° C. for 4 hrs to obtain 184 g of white polyethylene with a HLMI of 9.8 g/10 min, MI of 0.08 g/10 min, bulk density of 0.18 g/cm$^3$, density of 0.954 g/cm$^3$ and hexane extractable of 1.4 wt %. The polymer was also characterized by GPC and showed bimodal molecular weight distribution.

Obviously, numerous modifications and variations of the present invention are possible in light of the above teachings. It is therefore understood that within the scope of the appended claims, the invention may be practiced otherwise than as specifically described herein.

What is claimed is:

1. An olefin polymerization catalyst, having a solid catalyst component and an organoaluminum compound, comprising:
   (A) a solid catalyst component being prepared by copulverizing a magnesium compound, said magnesium compound being represented by the general formula Mg(OR)$_{2-n}$X$_n$ wherein R is an alkyl radical containing up to 12 carbon atoms, $1 \leq n \leq 2$ and X is a halogen atom; an aluminum compound, said aluminum compound being represented by the general formula Al(OR')$_3$ wherein R' is an alkyl radical containing up to 12 carbon atoms or an aryl group; an electron donor from organic compounds which contain at least one atom selected from oxygen, silicon, nitrogen, sulfur and phosphorus atoms, and a titanium compound; and
   (B) an organoaluminum compound.

2. The catalyst according to claim 1 wherein said magnesium compound is selected from the group consisting of magnesium dichloride, magnesium dibromide, magnesium difluoride, magnesium diiodide, magnesium ethoxchloride, magnesium methoxychloride and magnesium isopropoxychloride.

3. The catalyst according to claim 2 wherein said magnesium compound is magnesium dichloride.

4. The catalyst according to claim 1 wherein said aluminum compound is represented by the general formula Al(OR$^1$)$_r$(OR$^2$)$_s$ wherein R$^1$ and R$^2$ are different and are each alkyl radicals containing up to 12 carbon atoms or an aryl group, and r+s=3.

5. The catalyst according to claim 1 wherein said aluminum compound is represented by the general formula Al(OR')$_3$ wherein R' is an alkyl radical containing up to 12 carbon atoms.

6. The catalyst according to claim 5 wherein said aluminum compound is selected from the group consisting of aluminum trimethoxide, aluminum tri-n-propoxide, aluminum triisopropoxide, aluminum tri-n-butoxide, aluminum tri-sec-butoxide, aluminum tri-t-butoxide, diethoxyaluminum butoxide, ethoxyaluminum dibutoxide and aluminum phenoxide.

7. The catalyst according to claim 6 wherein said aluminum compound is selected from the group consisting of aluminum triethoxide and aluminum trimethoxide.

8. The catalyst according to claim 1 wherein said electron donor is selected from the groups consisting of ethers, alcohols, esters, ketones, silanes, amines, acyl halides, phosphines, and phosphine amides.

9. The catalyst according to claim 8 wherein said esters are saturated or unsaturated eaters represented by the formula R$^1$COOR$^2$ wherein R$^1$ and R$^2$ each is alkyl, alkenyl, aralkyl, cycloalkyl or aryl, or those substituted with halogen, or cyclic esters.

10. The catalyst according to claim 9 wherein said esters are selected from the group consisting of butyl formate, ethyl acetate, butyl acetate, ethyl acrylate, ethyl butyrate, isobutyl isobutyrate, methyl methacrylate, diethyl maleate, diethyl tartrate, ethyl cyclohexanecarbonate, ethyl benzoate, ethyl p-methoxybenoate, methyl p-methylbenzoate, ethyl p-tert-butylbenzoate, dialkyl phthalate, dially phthalate, and ethyl alpha-naphthoate.

11. The catalyst according to claim 8 wherein silanes are selected from the group consisting of tetrahydrocarbylsilanes and their halogen or alkoxy derivatives, linear or cyclic organopolysilanes, siloxane polymers, and other silicon-containing organic compounds.

12. The catalyst according to claim 11 wherein said silanes are selected from the group consisting of tetramethylsilane, trimethylphenylsilane, diethyldichlorosilane, phenyltrichlorosilane, diphenyldichlorsilane, triethoxymethylsilane, diphenyldimethoxysilane, dimethyldiethoxysilane, diethyldiethoxysilane, triphenylethoxysilane, hexaphenyldisilane, dimethypolysiloxane, diphenylpolysiloxane, and 2-(trimethoxysilyethyl)pyridine.

13. The catalyst according to claim 1 wherein said titanium compound is represented by the formula Ti(OR")$_{4-p}$X$_p$ wherein R" is an alkyl radical containing up to 12 carbon atoms, $1 \leq p \leq 4$ and X is a halogen atom.

14. The catalyst according to claim 1 wherein said titanium compound is selected from the group consisting of titanium tetrachloride, triethoxytitanium chloride, diethoxytitanium dichloride, tributoxytitanium chloride, dibutoxytitanium dichloride, butoxytitanium trichloride and ethoxytitanium trichloride.

15. The catalyst according to claim 1 wherein said catalyst components have ratios of: the mole ratio of the aluminum compound to the magnesium compound from 0.005:1 to 1:1, the mole ratio of the electron donor to the magnesium compound from 0.005:1 to 1:1, and the amount of titanium in the resulting solid from 0.5 to 10% by weight.

16. The catalyst according to claim 1 wherein said organoaluminum compound is represented by the formula AlR'''$_q$Y$_{3-q}$ wherein R''' represents hydrogen or an alkyl radical containing up to 12 carbon atoms, Y represents a halogen or an alkoxy group having from about 1 to 2 carbon atoms and q is in a range of $1 \leq q \leq 3$.

17. The catalyst according to claim 16 wherein said organoaluminum compound is selected from the group consisting of triethylaluminum, tri-n-propylaluminum, tri-iso-butylaluminum, tri-n-octylaluminum, tri(2- methylpentyl) aluminum, di-iso-butylaluminum hydride, ethylaluminum sesquichloride, diethylaluminum chloride, ethylaluminum dichloride, diethylaluminum ethoxide, diethylaluminum iodide, methylaluminoxane, and ethylaluminoxane, and among them triethyaluminum is particularly preferable.

18. The catalyst according to claim 1 wherein the molar ratio of the organoaluminum compound to the metal titanium in the solid catalyst component A may range 1000:1 to 0.5:1.

\* \* \* \* \*

UNITED STATES PATENT AND TRADEMARK OFFICE
CERTIFICATE OF CORRECTION

| | | |
|---|---|---|
| PATENT NO. | : 6,887,817 B2 | Page 1 of 1 |
| APPLICATION NO. | : 10/649206 | |
| DATED | : May 3, 2005 | |
| INVENTOR(S) | : Bing Lu, Honglan Lu and Chih-Jian Chen | |

It is certified that error appears in the above-identified patent and that said Letters Patent is hereby corrected as shown below:

Claim 9, col. 18, line 16, delete "eaters" and insert --esters-- therefor.

Claim 12, col. 18, line 37, delete "triethoxymethylsilane" and insert --trimethoxymethylsilane-- therefor.

Signed and Sealed this

Seventeenth Day of October, 2006

JON W. DUDAS
*Director of the United States Patent and Trademark Office*